US010095630B2

United States Patent
Jermář

(10) Patent No.: US 10,095,630 B2
(45) Date of Patent: Oct. 9, 2018

(54) SEQUENTIAL ACCESS TO PAGE METADATA STORED IN A MULTI-LEVEL PAGE TABLE

(71) Applicant: Avast Software s.r.o., Praha (CZ)

(72) Inventor: Jakub Jermář, Praha (CZ)

(73) Assignee: AVAST SOFTWARE S.R.O., Praha (CZ)

( * ) Notice: Subject to any disclaimer, the term of this patent is extended or adjusted under 35 U.S.C. 154(b) by 0 days.

(21) Appl. No.: 15/394,043

(22) Filed: Dec. 29, 2016

(65) Prior Publication Data

US 2017/0192905 A1    Jul. 6, 2017

Related U.S. Application Data

(60) Provisional application No. 62/273,198, filed on Dec. 30, 2015.

(51) Int. Cl.
*G06F 12/10* (2016.01)
*G06F 12/1009* (2016.01)

(52) U.S. Cl.
CPC .. *G06F 12/1009* (2013.01); *G06F 2212/1016* (2013.01); *G06F 2212/657* (2013.01)

(58) Field of Classification Search
CPC .................................................. G06F 12/1009
USPC ................................................. 711/120, 206
See application file for complete search history.

(56) References Cited

U.S. PATENT DOCUMENTS

| 5,606,685 | A | 2/1997 | Frandeen | |
|---|---|---|---|---|
| 2007/0055834 | A1 | 3/2007 | Lameter | |
| 2012/0075319 | A1* | 3/2012 | Dally | G06F 12/0284 345/537 |
| 2014/0075136 | A1* | 3/2014 | Davies | G06F 12/1027 711/159 |
| 2015/0347302 | A1* | 12/2015 | Hagersten | G06F 12/0862 711/122 |

OTHER PUBLICATIONS

Zhao et al., Efficient Memory Shadowing for 64-bit Architectures, ISMM '10, Jun. 5-6, 2010, Toronto, Ontario, Canada.
Zhao et al., Umbra: Efficient and Scalable Memory Shadowing, CGO '10, Apr. 24-28, 2010, Toronto, Ontario, Canada.
Pin—A Dynamic Binary Instrumentation Tool, https://software.intel.com/en-us/articles/pin-a-dyamic-binary-instrumentation-tool. Accessed Mar. 31, 2017.
Madvise (3C), Standard C Library Functions, http://illumos.org/man/3C/madvise. Accessed Mar. 31 2016.
Posix_madvise—memory advisory information and alignment control (Advanced Realtime), The Open Group Base Specifications, 2004, Issue 6, The IEEE and the Open Group, http:/pubs.opengroup.org/onlinepubs/009695399/functions/posix_madvise.html. Accessed Mar. 29, 2017.

* cited by examiner

*Primary Examiner* — Pierre Miche Bataille
(74) *Attorney, Agent, or Firm* — Husch Blackwell LLP

(57) ABSTRACT

Systems and methods enable initializing and accessing page metadata stored in the last level of a multi-level page table, wherein an effort is made to reduce the number of metadata initializations and the number of page table walks for sequential accesses in comparison with a naïve method realized by a sequence of random accesses.

21 Claims, 8 Drawing Sheets

SEQUENTIAL ACCESS TO PAGE METADATA STORED IN A MULTI-LEVEL PAGE TABLE

CROSS-REFERENCE TO RELATED APPLICATIONS

This Application claims priority to U.S. Provisional Patent Application Ser. No. 62/273,198, filed on Dec. 30, 2015, to Jakub Jermar, entitled "Sequential Access to Page Metadata Stored in a Multi-Level Page Table," the entire disclosure of which is incorporated herein by reference.

FIELD

The disclosure relates generally to computing systems, and more particularly, to sequential access to page metadata stored in a multi-level page table of a computing system.

BACKGROUND

Virtual memory hardware, and software such as operating systems and binary instrumentation frameworks often partition memory into fixed-size chunks called pages. In order to store and retrieve metadata associated with these pages, both hardware and software can use a data structure called the page table. The page size and the exact layout of the page table may or may not be dictated by the hardware and performance considerations.

In the case of 32-bit address spaces and with a typical page size of 4 kilobytes, the number of pages is 1,048,576. Depending on the size of metadata associated with each page, the simplest page table can be implemented as a mere one-dimensional array of 1,048,576 elements of the domain type representing the metadata. For example, if the metadata is 4-bytes in size per page, the total amount of memory taken up by such a trivial one-dimensional page table would be 4 megabytes. The one-dimensional page table is accessed using a page number as an index. The page number is the result of dividing a memory address by the page size.

While the one-dimensional approach may still be viable for 32-bit address spaces, its direct application in larger address spaces, such as a full 64-bit address space, is becoming increasingly unbearable as the width of the address space grows.

The typical page size of 4 kilobytes is still a commonplace with 64-bit address spaces and so there are 4,503,599,627,370,496 4-kilobyte pages in them. If the metadata continues to be 4-bytes in size per page, the total amount of memory taken up by a hypothetical one-dimensional page table would be 16 petabytes, which is clearly beyond practical usability and also beyond the memory capacities found in the contemporary computers.

The one-dimensional approach is therefore not viable for large address spaces. Moreover, it can be wasteful in terms of memory utilization and CPU cycles even in the case of a small 32-bit address space, when only a few pages are used and the rest is never accessed. In that case the portions of the page table that correspond to the unused pages are also unused, but must be allocated and initialized.

Hardware and operating systems have traditionally approached these problems by splitting the page table into 2, 3 or 4 levels of indirection. The drawback of this approach is slower access to the metadata. Where the one-dimensional approach did with only one memory access, the multi-level approach requires multiple accesses, which makes it slower.

Modern computer hardware deploys techniques such as automated or semi-automated page table walkers, and caches for the metadata stored in the page table to speed up the access to or the retrieval of the metadata. Unfortunately, software-only applications of the page table data structure cannot use assists like that and need to look for optimizations elsewhere.

SUMMARY OF THE INVENTION

Systems and methods for prefaulting page metadata enable (i) receiving a request to prefault a page range having a first address, (ii) determining a first-level index from the first address, (iii) determining if an address of a mid-level page table is in a first entry of a first-level page table at a position determined from the first-level index, (iv) in response to determining that the address of the mid-level page table is not in the first entry, allocating the mid-level page table and storing the address of the mid-level page table in the first entry, (v) determining a mid-level index from the first address, (vi) determining if an address of a last-level page table is in a second entry of the mid-level page table determined from the mid-level index, (vii) in response to determining that the address of the last-level page table is not in the second entry, allocating the last-level page table and storing the address of the last-level page table in the second entry, (viii) determining whether partial initialization was requested, (ix) in response to determining that partial initialization was requested, determining a complement of the page range and initializing the page metadata of the determined complement, (x) in response to determining that partial initialization was not requested, initializing the last-level page table, and (xi) further in response to determining that partial initialization was requested, setting an argument that is indicative of information regarding the necessity to finish a partial initialization process and setting the address of the last-level page table in the mid-level page table.

BRIEF DESCRIPTION OF THE DRAWINGS

For a better understanding of the disclosure, reference may be made to the accompanying drawings in which.

DETAILED DESCRIPTION

Figure 1:
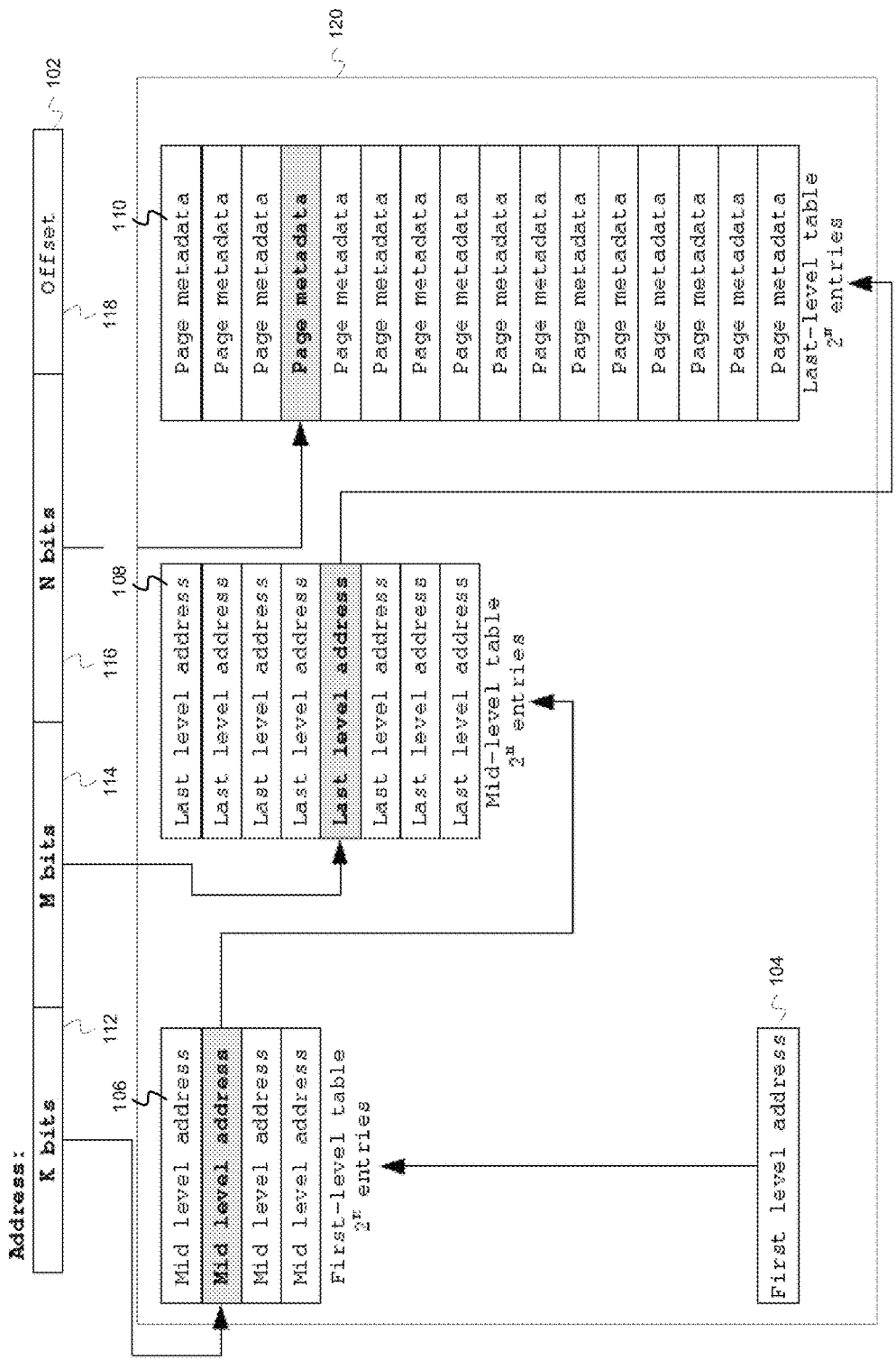
FIG. 1 is a block diagram illustrating a 3-level page table used to store page metadata.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Overview

Page metadata can be a data structure that holds arbitrary information about a memory page, such as various flags and values. The page metadata can be organized in a tree-like data structure called multi-level page table. Without the loss of generality, the description below uses a 3-level page table as an example aspect of the disclosure. However, the number of levels used by the multi-level page table is an implementation detail, and levels can be added or removed.

In some aspects, the metadata stored in a multi-level page table can be accessed in two modes. Random access assumes that two subsequent accesses reference metadata of random pages that are not necessarily adjacent to each other. Sequential access, on the other hand, assumes a sequence of consecutive pages of which the metadata is accessed.

A naïve implementation of sequential access can be trivially implemented using a sequence of random accesses. Such an implementation, however, may suffer with two inherent inefficiencies: excessive number of page table walks and double initialization of the metadata. The following text contains a description of an optimized method for sequential access. As used herein, "optimized" does not necessarily mean "best", but rather, an improvement over existing methods.

Example 3—Level Page Table

FIG. 1 is a block diagram illustrating a 3-level page table 120 used to store page metadata. In the example illustrated in FIG. 1, a memory address 102 is partitioned into four segments: a first segment 112 with K bits (referred to as the first-level index), a second segment 114 with M bits (referred to as the mid-level index), a third segment 116 with N bits (referred to as the last-level index) and an offset 118 with all the remaining bits that are ignored for the purposes of this text. Given an address of a page, its metadata can be found by reading the base address of the first-level page table from a global variable 104. In some aspects, the first-level page table 106 is allocated and zero-filled, and the global variable 104 is set to point to it upon initialization. In some aspects, the first-level table 106 has $2^K$ entries and the K-bit first-level index 112 of the page address 102 can be used as an index into the first-level table 106. The indexed value is the base address of the mid-level page table 108. In some aspects, the mid-level page table 108 has $2^M$ entries and can be indexed by the M-bit mid-level index 114 of the page address 102. The indexed value is the base address of the last-level page table 110. In some aspects, the last-level page table 110 has $2^N$ entries and can be indexed by the N-bit last-level index 116 of the page address 102. The last-level page table 110 at this index 116 contains the metadata of the looked-up page. In some aspects, if two distinct pages have their metadata in the same last-level page table 110, then the first-level index 112 and the mid-level index 114 for the pages are identical, and they differ only in the last-level index 116. While the first-level page table 106 is always present, the mid-level page table 108 and last-level page table 110 may initially not be present and can be allocated and initialized lazily as page metadata is inserted into the page table as is described below.

Prefaulting

Figure 2:
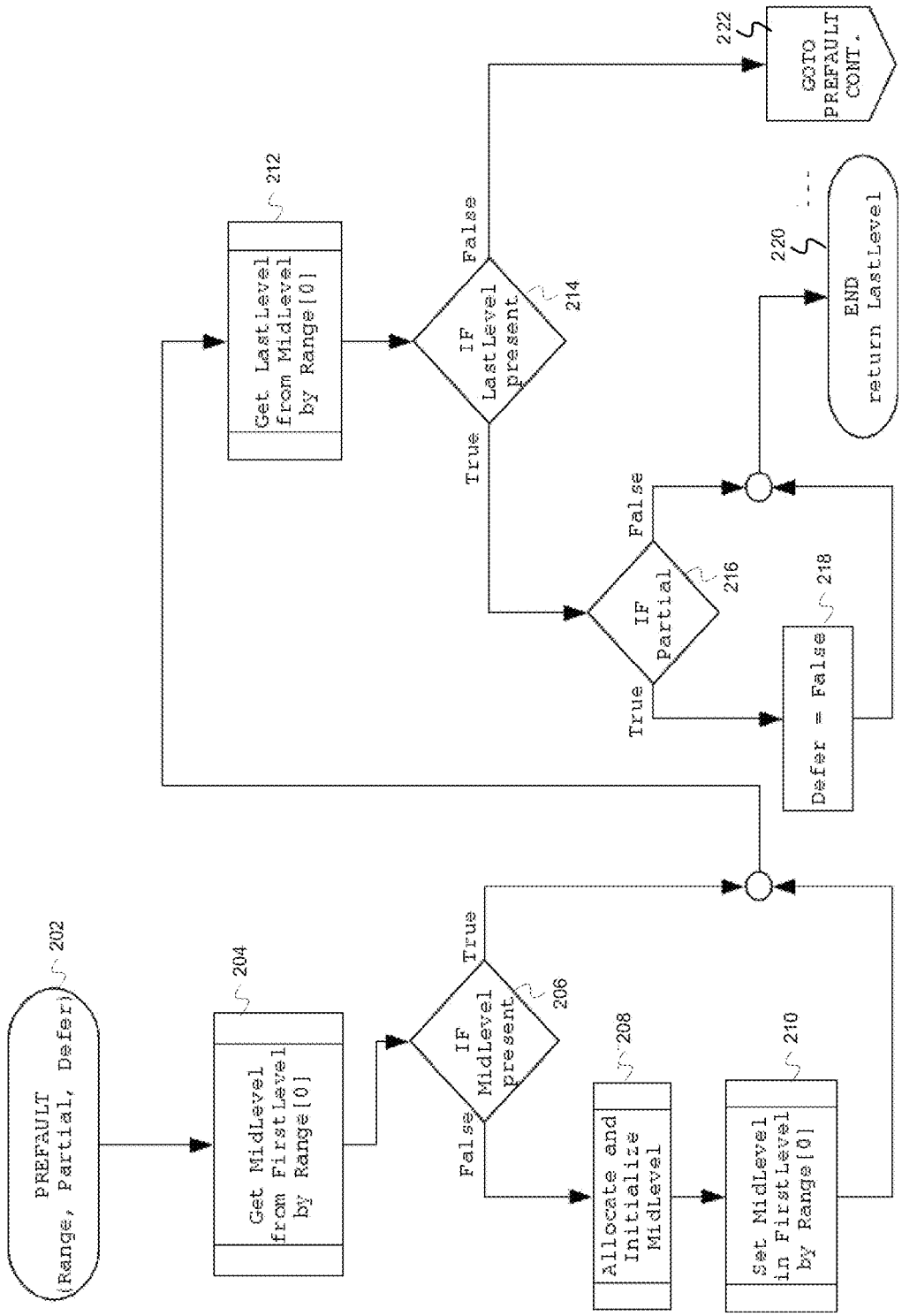
FIG. 2 and FIG. 3 are flow charts illustrating a method for prefaulting according to aspects of the disclosure.
Figure 3:
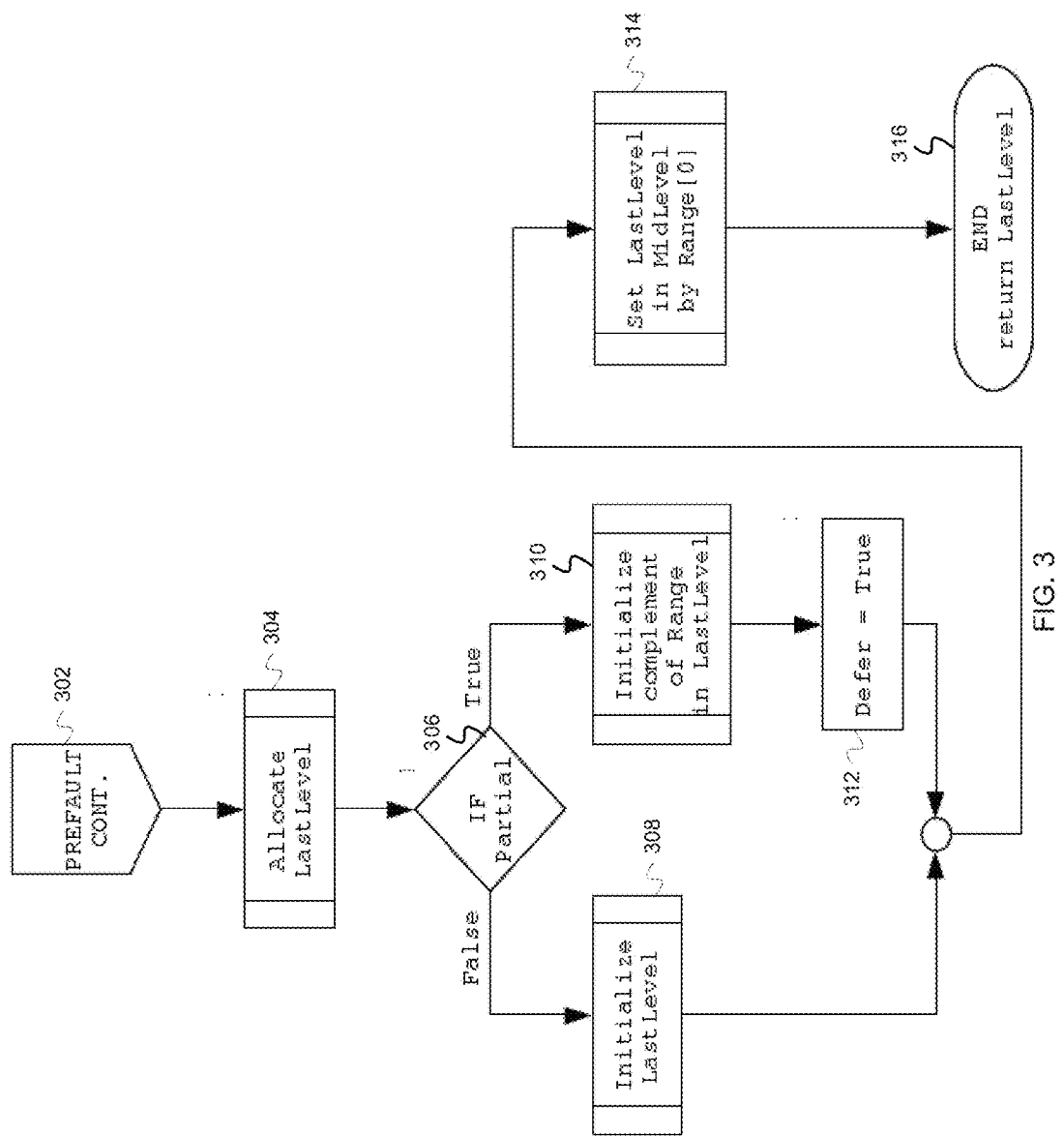

FIGS. 2 and 3 are flow charts 200 and 300 illustrating a method for prefaulting according to aspects of the disclosure. The method starts at block 202, where the prefault method can be invoked with two input arguments and optionally one output argument. The first argument, Range, is an input argument and determines the page range that the prefault method will operate on. In some aspects, the range consists of a number of consecutive pages that all have metadata in the same last-level page table 110. The second argument, Partial, is an input argument and tells the prefaulting method whether to perform partial or complete initialization of newly allocated metadata. The last argument, Defer, is an output argument and in some aspects, is mandatory when Partial is True. The argument Defer informs the invoker about the necessity to finish a partial initialization of newly allocated metadata.

At block 204, the first-level index 112 of the first page address from Range is used to index into the first-level page table 106 in order to determine the address of the mid-level page table 108.

At block 206, a test is made to determine if the mid-level page table 108 exists. If it does not exist, then at block 208, a new mid-level page table 108 is allocated and initialized. In some aspects, the mid-level table can be initialized with values that are semantically distinguishable from all other usable values. For example, if the page metadata contains a bitmask or a counter, the initialization value can be zero. At block 210, the address of the allocated mid-level page table 108 is recorded in the first-level page table at the index position determined by the first-level index 112. The method then proceeds to block 212.

If the test at block 206 determined that the mid-level page table 108 exists, then the method proceeds to block 212.

At block 212, the mid-level index 114 of the first page address from Range is used to index into the mid-level page table 108 in order to determine the address of the last-level page table 110.

At block 214, a test is made to determine if the last-level page table 110 exists. If it does exist, then at block 216, another test is made to determine if partial initialization was requested. If Partial is True, then at block 218 Defer is set to False. After executing block 216 and block 218, or if the test at block 216 determines that that Partial is False, then at block 220, the prefaulting method ends by returning the address of the last-level page table 110.

Continuing to FIG. 3 (via block 222 to block 224), if the test executed at block 214 determined that the last-level page table 110 does not exist, then at block 304, the prefault method continues by allocating a last-level page table 110.

At block 306, the prefault method determines whether the page metadata in the new last-level page table 110 needs to be initialized completely or partially. At block 308, a complete initialization of all new page metadata is performed if partial initialization was not requested, regardless of Range.

Alternatively, if partial initialization is requested, then at block 310, the prefault method computes the complement of Range and only initializes the new page metadata of the computed complement, leaving the metadata belonging to Range uninitialized. The complement of the Range is initialized, leaving the invoker (user) to initialize the Range. At block 312, the prefault method indicates to the invoker that the invoker is to finish the initialization of the metadata by setting Defer to True.

At block 314, the address of the new last-level page table 110 is recorded in the mid-level page table 108 at the index position determined by the mid-level index 114.

At block 316, the prefault method ends by returning the address of the new last-level page table 110.

Random Access

Figure 4:
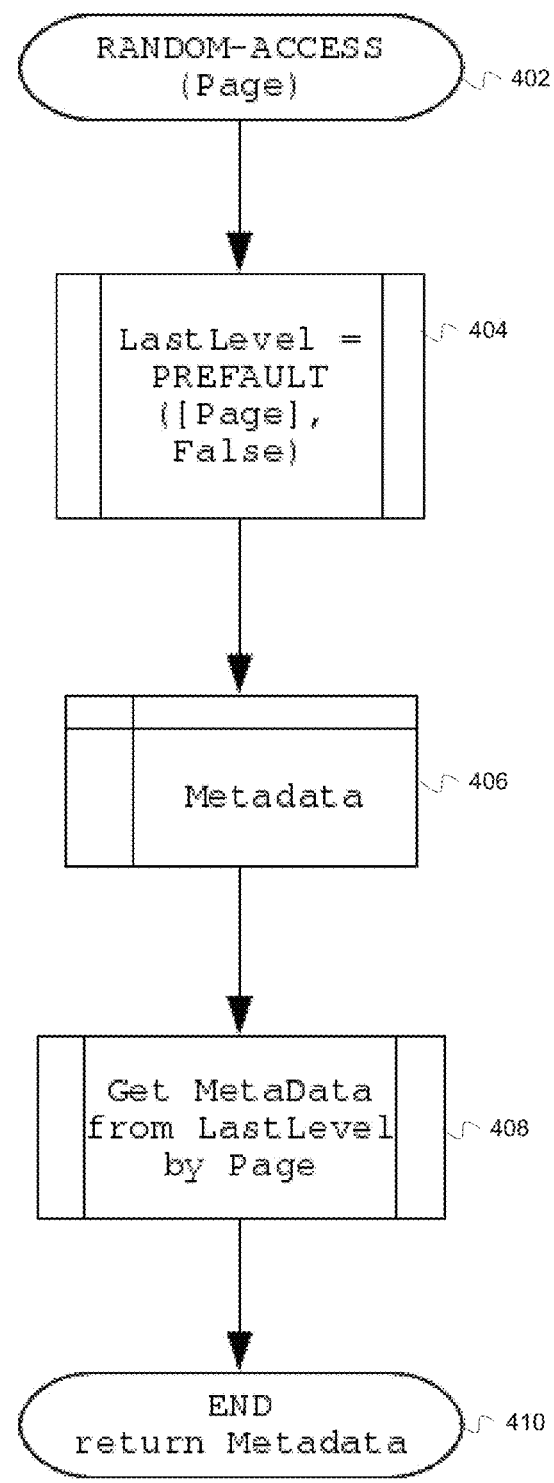
FIG. 4 is a flow chart illustrating a method for random access of a page table based on prefaulting.

FIG. 4 is a flow chart 400 illustrating a method for random access of a page table based on prefaulting. At block 402, the method takes Page as its input argument.

At block 404, a one-page range is constructed from Page and the prefault method illustrated above in FIGS. 2 and 3 is invoked on it. In some aspects, for this invocation of the prefault method, a partial initialization of newly allocated metadata is not requested. When the prefault method finishes, it returns the address of the last-level page table 110.

At block 406, local storage called Metadata is allocated. In some aspects, Metadata can be a reference (e.g., a pointer) to the page metadata 110.

At block 408, the Metadata local storage is set to reference the actual metadata indexed by Page's last-level index 116 in the last-level page table 110.

At block 410, Metadata is returned, which concludes the method.

Naïve Sequential Access

Figure 5:
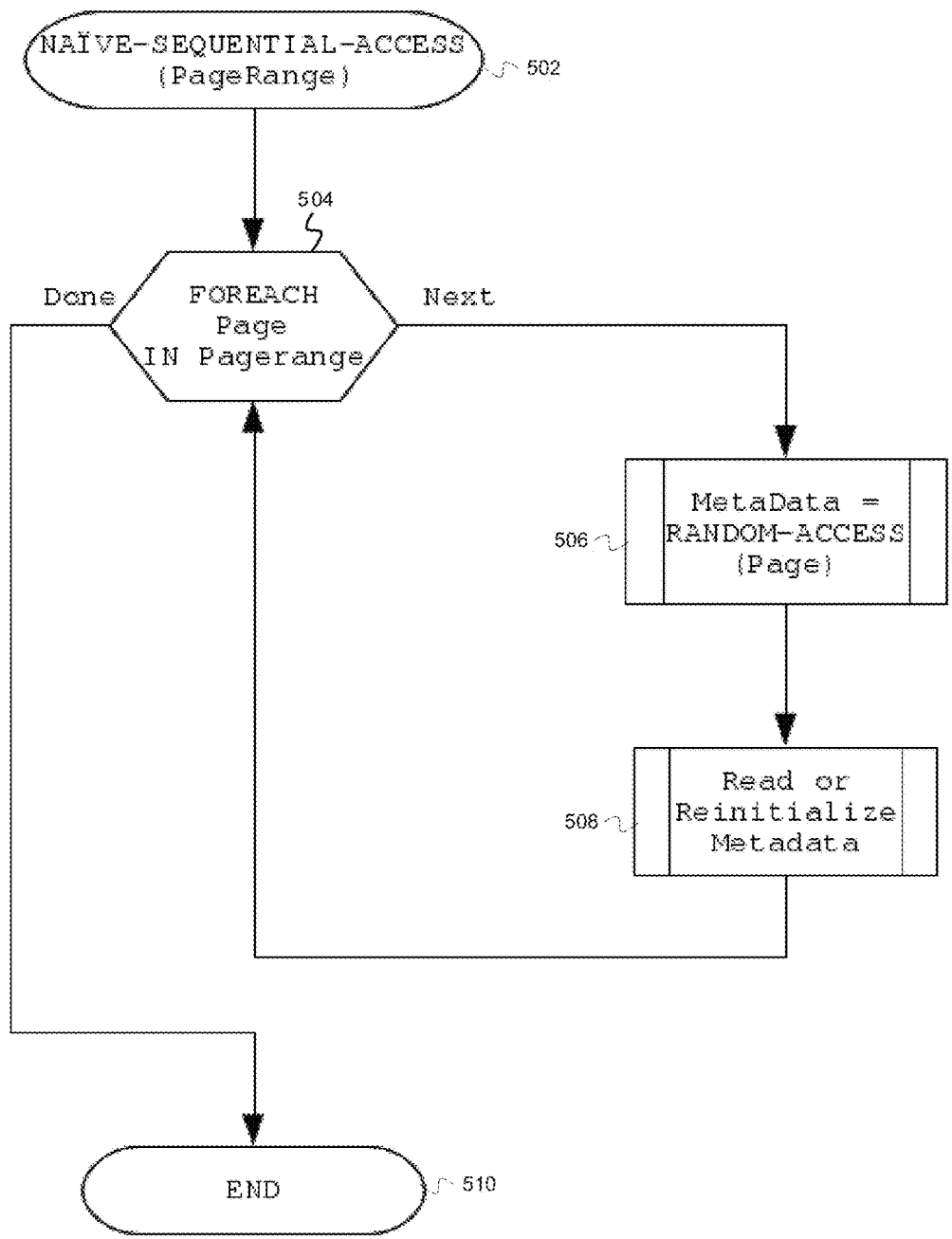
FIG. 5 is a flow chart illustrating a method for naive sequential access to page table metadata based on random access.

FIG. 5 is a flow chart 500 illustrating a naive sequential access to page table metadata based on random access. At block 502, the input page range called PageRange is passed as an argument.

Block 504 is the top of a loop that iterates over all pages in PageRange, using Page as the iterator. Each iteration starts at block 506, where the method for random access to a page table illustrated in FIG. 4 is invoked on Page. At block 508, the returned metadata is either read or reinitialized in a user-defined behavior, which ends the iteration.

After all iterations complete, at block 510 the naive sequential access method ends.

Sequential Access

Figure 6:
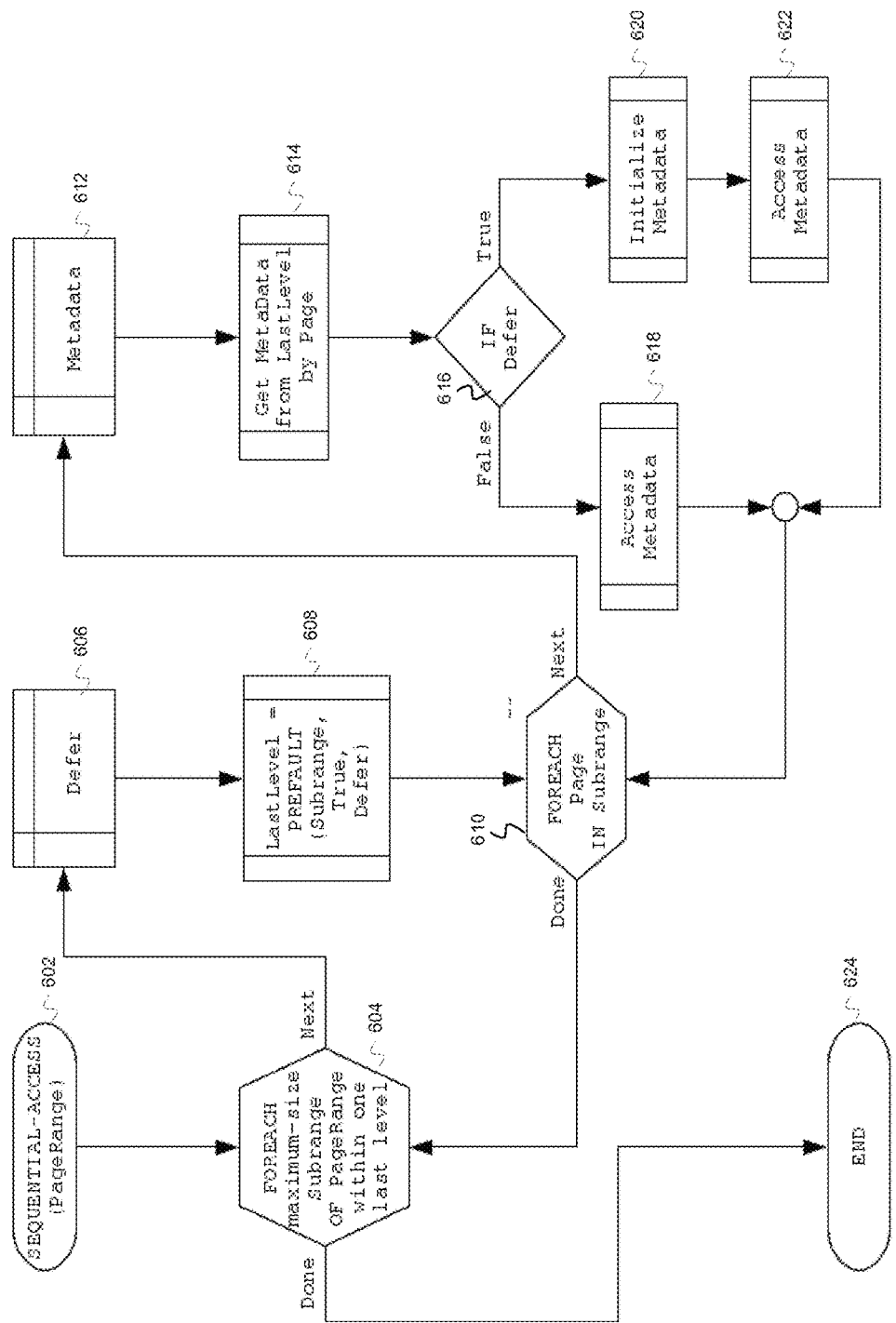
FIG. 6 is a flow chart illustrating a method for sequential access of a page table based on prefaulting.

FIG. 6 is a flow chart 600 illustrating a method for sequential access of a page table based on prefaulting. At block 602, the input page range is passed in PageRange.

At block 604, the method iterates over all maximum-size subranges of PageRange that include pages with metadata in the same last-level page table 110. The current subrange of each iteration is referred to as Subrange.

At block 606, a new iteration starts with the allocation of local storage called Defer.

At block 608, the prefault method of FIGS. 2 and 3 is invoked on Subrange where partial initialization of newly allocated metadata is requested and the reference to Defer is passed to it. When the prefault method finishes, it returns the address of the last-level page table 110 where all the metadata for the Subrange resides. If a new last-level page table 110 was allocated, Defer is True, otherwise Defer is False.

At block 610, the sequential access method continues by iterating over all pages from Subrange. The current page of each iteration is referred to as Page.

At block 612, a new iteration starts with the allocation of local storage called Metadata.

At block 614, Metadata is set to reference the actual metadata indexed by Page's last-level index 116 in the last-level page table 110.

At block 616, a test is made to determine the value of Defer. If Defer is False, then at block 618, the last-level page table 110 is not new and it is thus already initialized. Therefore, Metadata can be accessed directly at block 618. Block 618 encapsulates a user-defined behavior in which Metadata is accessed without the need for initialization.

If the test at block 616 determines that Defer is True, the last-level page table 110 has been allocated by the prefault method illustrated in FIGS. 2 and 3, and some or all of the metadata residing in it is not initialized. At block 620, Metadata for pages in Subrange is initialized. At block 622, the Metadata for the pages in the Subrange can be accessed. Block 620 and 622, respectively, encapsulate user-defined behaviors in which Metadata is initialized and accessed, respectively.

When all iterations in block 610 and 604 complete, the method ends at block 624.

Example

Figure 7:
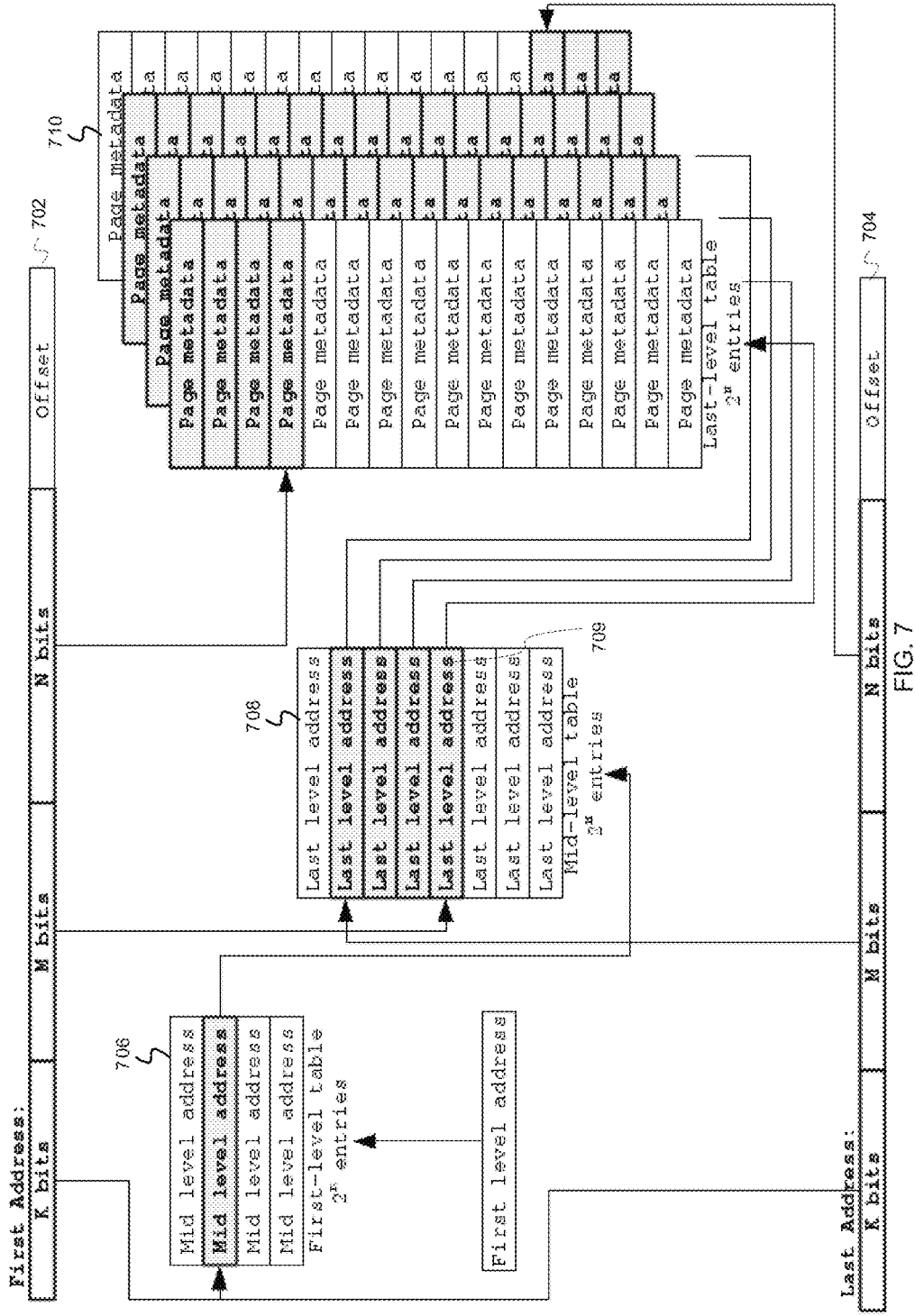
FIG. 7 illustrates an example use case with a page range consisting of 39 pages.

FIG. 7 illustrates an example use case with a page range between first address 702 and last address 704 comprising 39 pages. The metadata for these pages reside in the four last-level page tables 710 mapped by the four highlighted consecutive entries in the mid-level page table 708. The first mid-level page table 708 entry 709 maps a last-level page table 710 that overlaps with the page range only partially: i.e., its last four pages fall into the range. The second and third mid-level page table 708 entries map last-level page tables 710 that are entirely included in the page range. The fourth mid-level page table 708 entry maps a last-level page table 710 that again overlaps with the page range only partially: i.e., its first three pages fall into the range.

For the purposes of the example, assuming the page table does not have any last-level page tables 710 allocated yet and that the goal is to access the metadata of these 39 pages by storing the value of 1 in each, the following paragraphs illustrate how each of the considered sequential access methods performs.

If the metadata of these 39 pages were accessed using the naive sequential access method illustrated in FIG. 5, the whole page table would be completely walked 39 times. The four new last-level page tables 710 would be allocated and initialized and then each page's metadata would be reinitialized by storing 1 into it, thus 39 last-level page table indices will be initialized twice. The two last-level page tables 710 that completely fall into the page range will be reinitialized completely, which can make their first initialization in the prefault method of FIGS. 2 and 3 pointless and wasteful.

If, on the other hand, the metadata of these 39 pages were accessed using the sequential access method illustrated in FIG. 6, the whole page table would be completely walked only four times: once for each last-level page table 710. The metadata of all 39 pages would be initialized just once. The prefault method illustrated in FIGS. 2 and 3 will completely skip the initialization of the second and third last-level page tables 710, because the sequential access method of FIG. 6 will handle it itself and there is a mechanism to communicate this between the sequential access method of FIG. 6 and the prefault method of FIGS. 2 and 3.

In the case of this example use case, the sequential access method will save 35 page table walks and 39 initializations, including the complete initialization of two last-level page tables 710.

In general, for sequential access to page metadata of C pages, the naive sequential access method illustrated in FIG. 5 makes C page table walks and up to 2C metadata initializations. On the other hand, the optimized sequential access method illustrated in FIG. 6 makes only between:

$$\left[\frac{C}{2^N}\right] \text{ and: } \left[\frac{C}{2^N}\right]+1$$

page table walks, depending on the alignment of the first page of the range, and up to C initializations. It should be noted that the above-described systems and methods can be implemented at the user-level (e.g., by a virtual machine, emulator, or other user-level application) or they can be implemented within an operating system.

Figure 8:
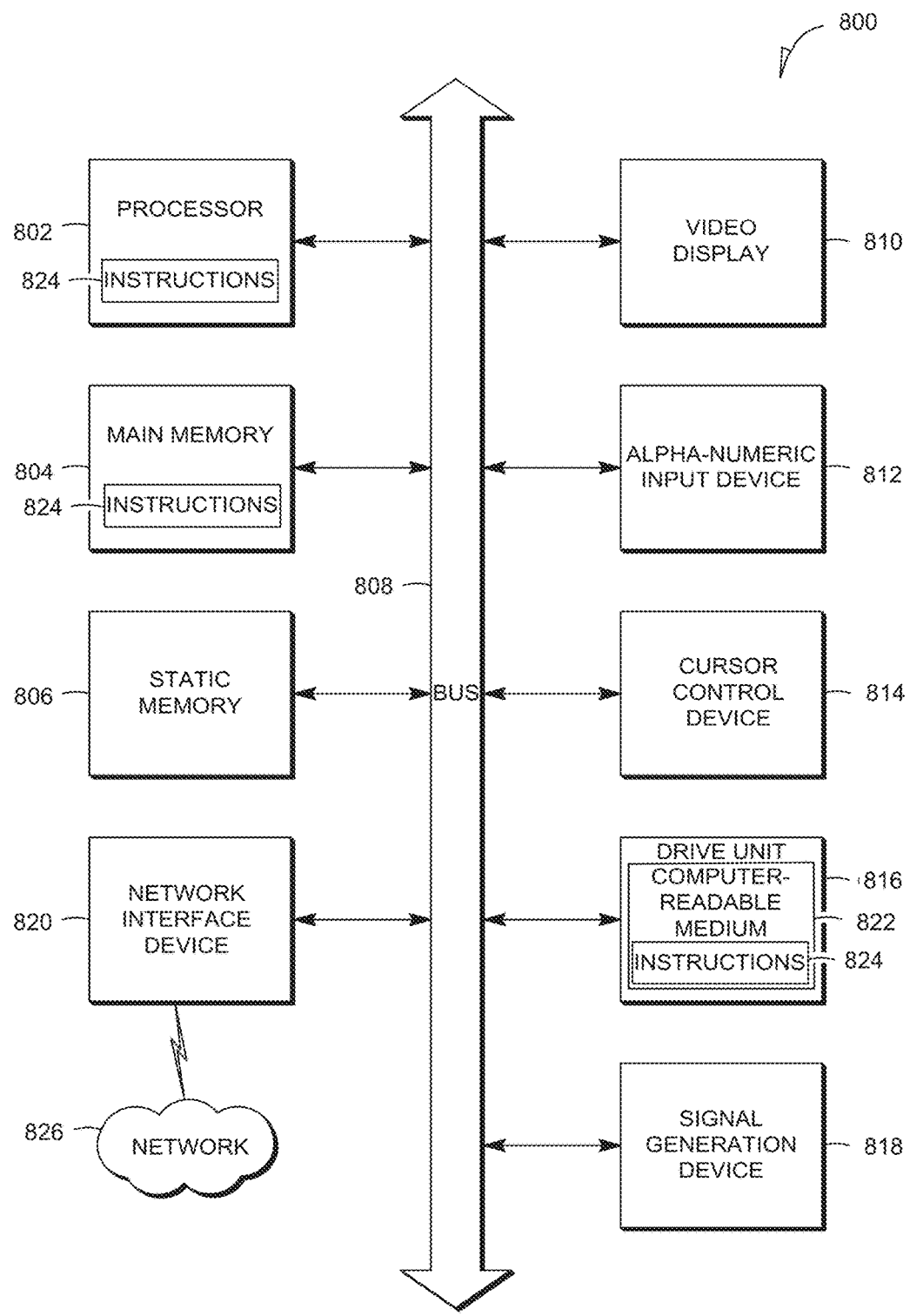
FIG. 8 is a block diagram of an example embodiment of a computer system upon which embodiments of the inventive subject matter can execute.

FIG. 8 is a block diagram of an example embodiment of a computer system 800 upon which embodiments of the inventive subject matter can execute. The description of FIG. 8 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 8 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the tetra "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 824 may further be transmitted or received over a communications network 826 using a signal transmission medium via the network interface device 820 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A system for prefaulting page metadata, wherein said system comprises at least one electronic processor for performing the steps of:
   receiving a request to prefault a page range having a first address;
   determining a first-level index from the first address;
   determining if an address of a mid-level page table is in a first entry of a first-level page table at a position determined from the first-level index;
   in response to determining that the address of the mid-level page table is not in the first entry, allocating the mid-level page table and storing the address of the mid-level page table in the first entry;
   determining a mid-level index from the first address;
   determining if an address of a last-level page table is in a second entry of the mid-level page table determined from the mid-level index;
   in response to determining that the address of the last-level page table is not in the second entry, allocating the last-level page table and storing the address of the last-level page table in the second entry;
   determining whether partial initialization was requested;
   in response to determining that partial initialization was requested, determining a complement of the page range and initializing the page metadata of the determined complement; and
   in response to determining that partial initialization was not requested, initializing the last-level page table.

2. The system of claim 1 wherein, in response to said determining that the address of the last-level page table is in the second entry, said system makes a determination whether partial initialization was requested.

3. The system of claim 2 wherein, in response to said making a determination that partial initialization was requested, said system sets an argument that is indicative of information regarding the necessity to finish a partial initialization process and returning the address of the last-level page table.

4. The system of claim 2 wherein, in response to said making a determination that partial initialization was not requested, said system returns the address of the last-level page table.

5. The system of claim 1 wherein, in response to said determining that partial initialization was requested, said system sets an argument that is indicative of information regarding the necessity to finish a partial initialization process and sets the address of the last-level page table in the mid-level page table.

6. The system of claim 1, wherein said system enables steps for randomly accessing a page table comprising:
   allocating a reference to metadata of a page that is indicative of the page range;
   setting local storage indicating the metadata to reference actual metadata that is indexed by a last-level index of the page in the last-level page table.

7. The system of claim 1, wherein said page range comprises a plurality of maximum-sized subranges that include pages with metadata in the last-level page table, wherein said system enables iterating over said plurality of maximum-sized subranges, wherein each said iteration over a maximum-sized subrange comprises:
   iterating over all pages of the maximum-sized subrange;
   setting local storage indicating the metadata to reference actual metadata that is indexed by a last-level index of the page in the last-level page table;
   determining a value of an argument that is indicative of information regarding the necessity to finish a partial initialization;
   in response to determining that the value of the argument that is indicative of information regarding the necessity to finish a partial initialization is false, then concluding that the least-level page table is not new and is already initialized and thereby the metadata can be accessed directly;

in response to determining that the value of the argument that is indicative of information regarding the necessity to finish a partial initialization is true, then concluding that at least some of the metadata residing in the last-level page table is not initialized and initializing and accessing metadata according to user-defined behaviors.

8. A method for prefaulting page metadata, the method comprising:

receiving a request to prefault a page range having a first address;

determining a first-level index from the first address;

determining if an address of a mid-level page table is in a first entry of a first-level page table at a position determined from the first-level index;

in response to determining that the address of the mid-level page table is not in the first entry, allocating the mid-level page table and storing the address of the mid-level page table in the first entry;

determining a mid-level index from the first address;

determining if an address of a last-level page table is in a second entry of the mid-level page table determined from the mid-level index;

in response to determining that the address of the last-level page table is not in the second entry, allocating the last-level page table and storing the address of the last-level page table in the second entry;

determining whether partial initialization was requested;

in response to determining that partial initialization was requested, determining a complement of the page range and initializing the page metadata of the determined complement; and in response to determining that partial initialization was not requested, initializing the last-level page table.

9. The method of claim 8 further comprising, in response to said determining that the address of the last-level page table is in the second entry, making a determination whether partial initialization was requested.

10. The method of claim 9 further comprising, in response to said making a determination that partial initialization was requested, setting an argument that is indicative of information regarding the necessity to finish a partial initialization process and returning the address of the last-level page table.

11. The method of claim 9 further comprising, in response to said making a determination that partial initialization was not requested, returning the address of the last-level page table.

12. The method of claim 8 further in response to said determining that partial initialization was requested, setting an argument that is indicative of information regarding the necessity to finish a partial initialization process and setting the address of the last-level page table in the mid-level page table.

13. The method of claim 8 further comprising a method for random access of a page table, said method further comprising:

allocating a reference to metadata of a page that is indicative of the page range;

setting local storage indicating the metadata to reference actual metadata that is indexed by a last-level index of the page in the last-level page table.

14. The method of claim 8, wherein said page range comprises a plurality of maximum-sized subranges that include pages with metadata in the last-level page table, said method further comprising iterating over the plurality of maximum-sized subranges, wherein each said iteration over a maximum-sized subrange comprises:

iterating over all pages of the maximum-sized subrange;

setting local storage indicating the metadata to reference actual metadata that is indexed by a last-level index of the page in the last-level page table;

determining a value of an argument that is indicative of information regarding the necessity to finish a partial initialization;

in response to determining that the value of the argument that is indicative of information regarding the necessity to finish a partial initialization is false, then concluding that the least-level page table is not new and is already initialized and thereby the metadata can be accessed directly;

in response to determining that the value of the argument that is indicative of information regarding the necessity to finish a partial initialization is true, then concluding that at least some of the metadata residing in the last-level page table is not initialized and initializing and accessing the metadata according to user-defined behaviors.

15. A non-transitory computer readable medium for prefaulting page metadata having instructions that when executed cause one or more electronic processors to perform the steps of:

receiving a request to prefault a page range having a first address;

determining a first-level index from the first address;

determining if an address of a mid-level page table is in a first entry of a first-level page table at a position determined from the first-level index;

in response to determining that the address of the mid-level page table is not in the first entry, allocating the mid-level page table and storing the address of the mid-level page table in the first entry;

determining a mid-level index from the first address;

determining if an address of a last-level page table is in a second entry of the mid-level page table determined from the mid-level index;

in response to determining that the address of the last-level page table is not in the second entry, allocating the last-level page table and storing the address of the last-level page table in the second entry;

determining whether partial initialization was requested;

in response to determining that partial initialization was requested, determining a complement of the page range and initializing the page metadata of the determined complement; and in response to determining that partial initialization was not requested, initializing the last-level page table.

16. The non-transitory computer readable medium of claim 15 further comprising instructions that, in response to said determining that the address of the last-level page table is in the second entry, make a determination whether partial initialization was requested.

17. The non-transitory computer readable medium of claim 16 further comprising instructions that when executed cause the one or more electronic processors to perform the step of, in response to said making a determination that partial initialization was requested, setting an argument that is indicative of information regarding the necessity to finish a partial initialization process and returning the address of the last-level page table.

18. The non-transitory computer readable medium of claim 16 further comprising instructions that when executed cause the one or more electronic processors to perform the step of, in response to said making a determination that partial initialization was not requested, returning the address of the last-level page table.

19. The non-transitory computer readable medium of claim 15 further comprising instructions that when executed cause the one or more electronic processors to perform the step of in response to said determining that partial initialization was requested, setting an argument that is indicative of information regarding the necessity to finish a partial initialization process and setting the address of the last-level page table in the mid-level page table.

20. The non-transitory computer readable medium of claim 15 further comprising instructions that when executed cause the one or more electronic processors to perform steps for randomly accessing a page table, said steps for randomly accessing a page table further comprising:
    allocating a reference to metadata of a page that is indicative of the page range;
    setting local storage indicating the metadata to reference actual metadata that is indexed by a last-level index of the page in the last-level page table.

21. The non-transitory computer readable medium of claim 15, wherein said page range comprises a plurality of maximum-sized subranges that include pages with metadata in the last-level page table, further comprising instructions that when executed cause the one or more electronic processors to perform steps of iterating over said plurality of maximum-sized subranges, wherein each said iteration over a maximum-sized subrange comprises:
    iterating over all pages of the maximum-sized subrange;
    setting local storage indicating the metadata to reference actual metadata that is indexed by a last-level index of the page in the last-level page table;
    determining a value of an argument that is indicative of information regarding the necessity to finish a partial initialization;
    in response to determining that the value of the argument that is indicative of information regarding the necessity to finish a partial initialization is false, then concluding that the least-level page table is not new and is already initialized and thereby the metadata can be accessed directly;
    in response to determining that the value of the argument that is indicative of information regarding the necessity to finish a partial initialization is true, then concluding that at least some of the metadata residing in the last-level page table is not initialized and initializing and accessing metadata according to user-defined behaviors.

* * * * *